Oct. 13, 1931.   P. Y. BORODIN   1,827,506
BINDER
Filed July 3, 1928   5 Sheets-Sheet 1

PAWEL Y. BORODIN
INVENTOR

BY *John P. Mironow*
ATTORNEY

Oct. 13, 1931.  P. Y. BORODIN  1,827,506

BINDER

Filed July 3, 1928  5 Sheets-Sheet 2

PAWEL Y. BORODIN

INVENTOR

BY John P. Nixonow

ATTORNEY

Oct. 13, 1931.  P. Y. BORODIN  1,827,506
BINDER
Filed July 3, 1928  5 Sheets-Sheet 3

PAWEL Y. BORODIN
INVENTOR

BY John P. Nixonow
ATTORNEY

Oct. 13, 1931.  P. Y. BORODIN  1,827,506
BINDER
Filed July 3, 1928  5 Sheets-Sheet 4

PAWEL Y. BORODIN
INVENTOR

BY John P. Mironow
ATTORNEY

Oct. 13, 1931.   P. Y. BORODIN   1,827,506
BINDER
Filed July 3, 1928   5 Sheets-Sheet 5

PAWEL Y. BORODIN
INVENTOR
BY John P. Mironow
ATTORNEY

Patented Oct. 13, 1931

1,827,506

UNITED STATES PATENT OFFICE

PAWEL Y. BORODIN, OF MOSCOW, UNION OF SOVIET SOCIALIST REPUBLICS

BINDER

Application filed July 3, 1928. Serial No. 290,121.

My invention relates to binders and has a particular reference to reapers and binders combined and built in connection with a tractor.

The object of my invention is to provide a reaper-binder adapted to be directly operated by a tractor to which it is permanently attached. The further object of my invention is to provide a binder without any elevator, with a substantially horizontal belt for delivering the cut stalks to the binding deck. I also provide means for the tractor operator to adjust the height of the cutter bar and main binder platform, and to raise the platform with the belt and cutter bar when moving the tractor from and to the work.

My invention is more fully described in the accompanying specification and drawings in which—

Figure 1:
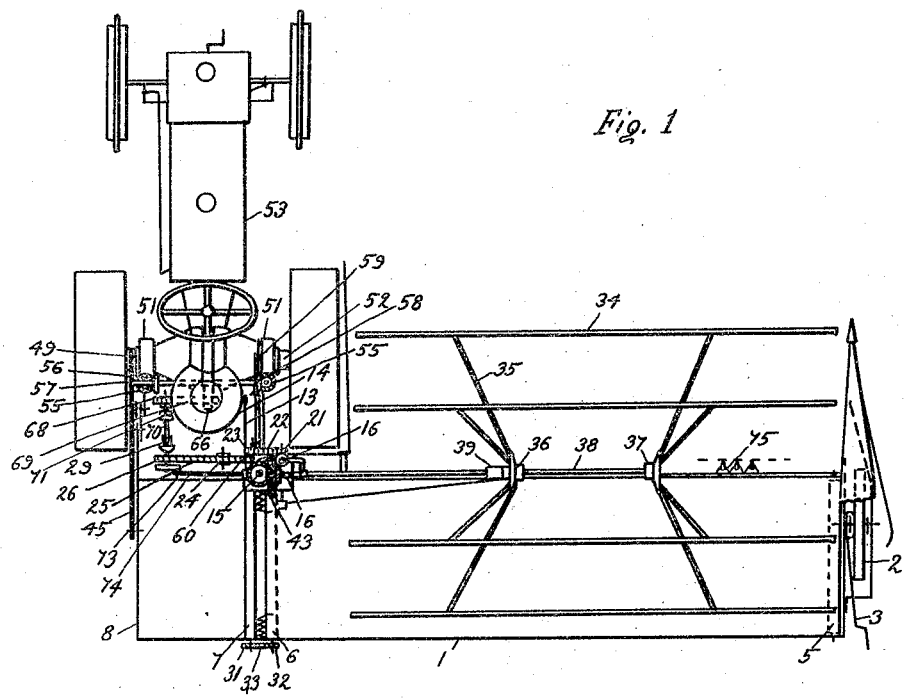
Figure 2:
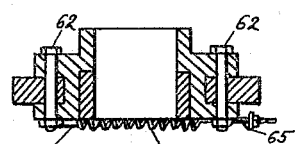
Figure 3:
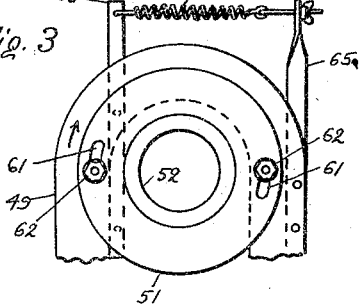
Figure 4:
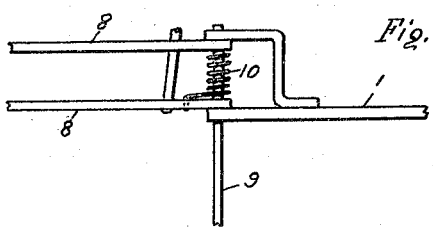
Figure 5:
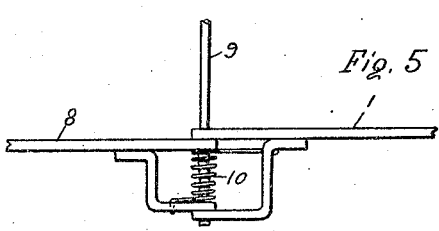
Figure 6:
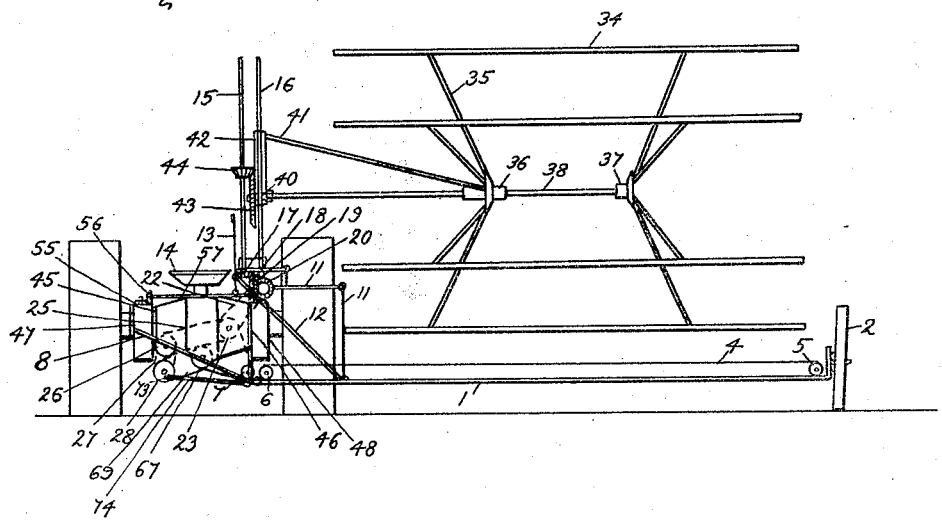
Figure 7:
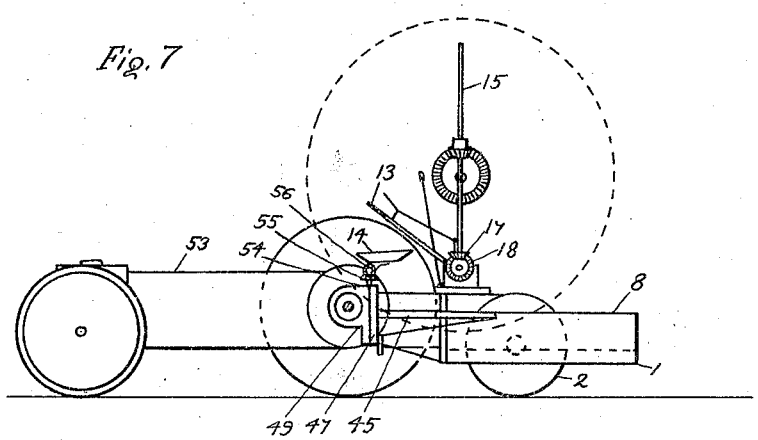
Figure 8:
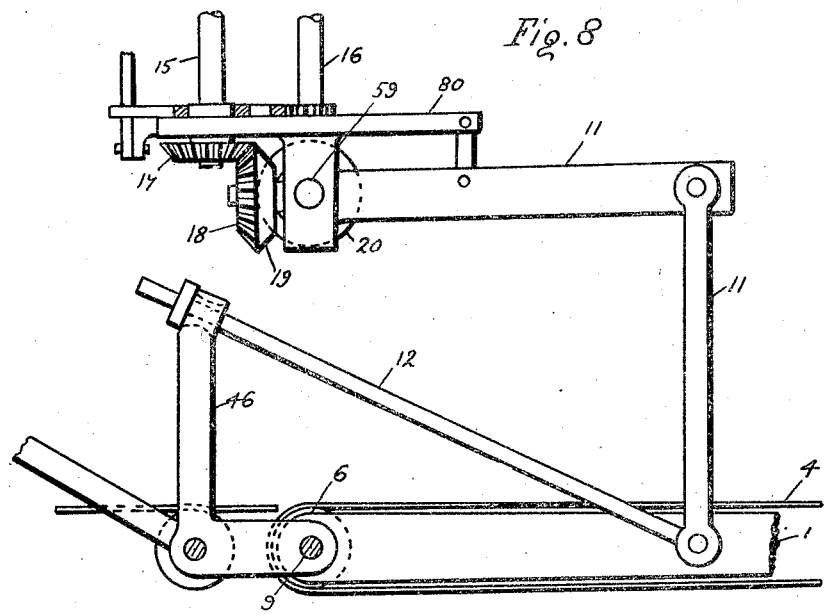
Figure 9:
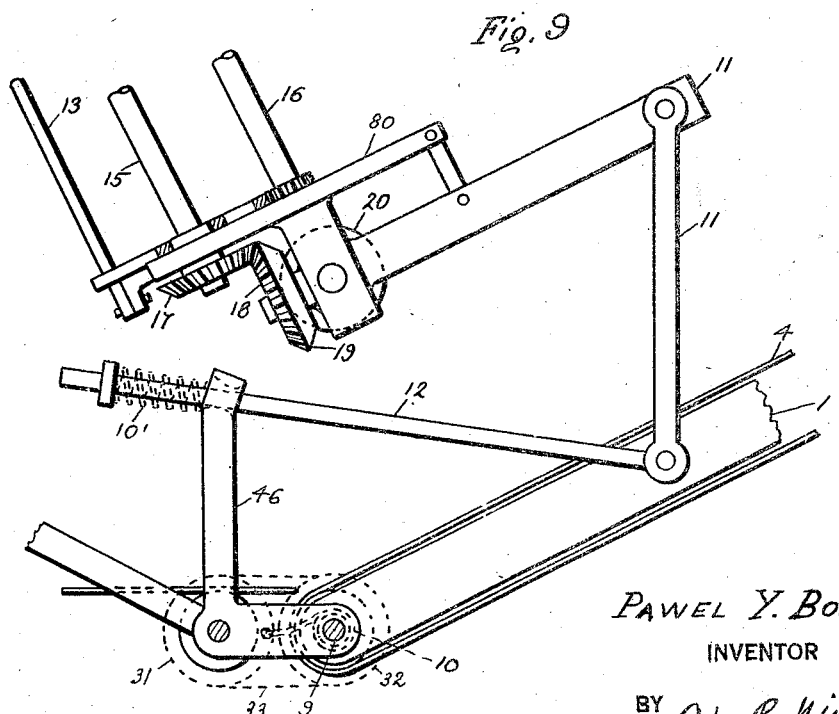
Figure 10:
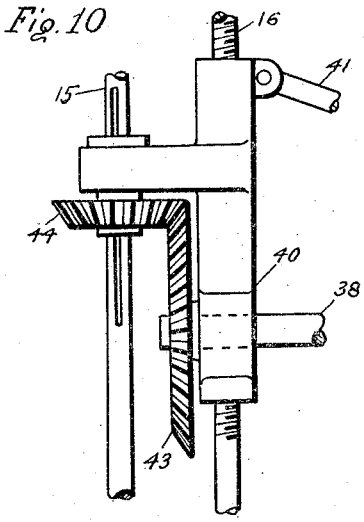
Figure 13:
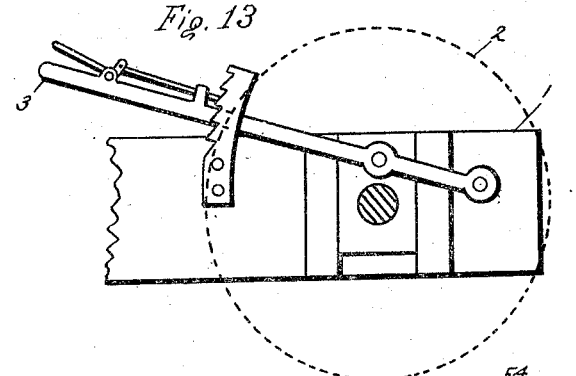
Figure 11:
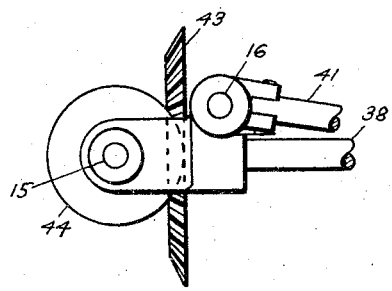
Figure 14:
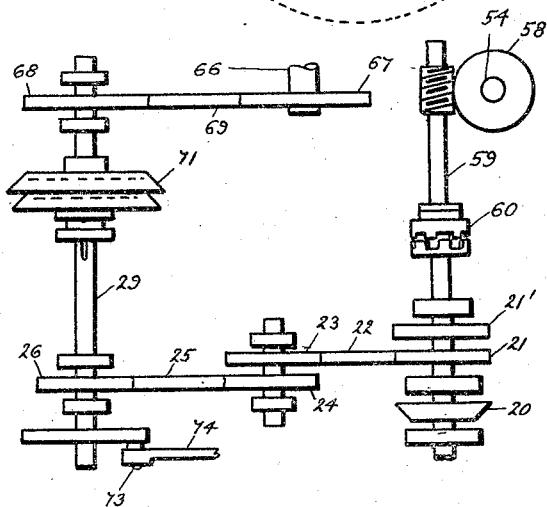
Figure 12:
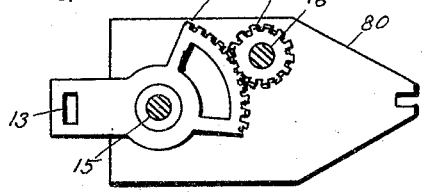
Figure 15:
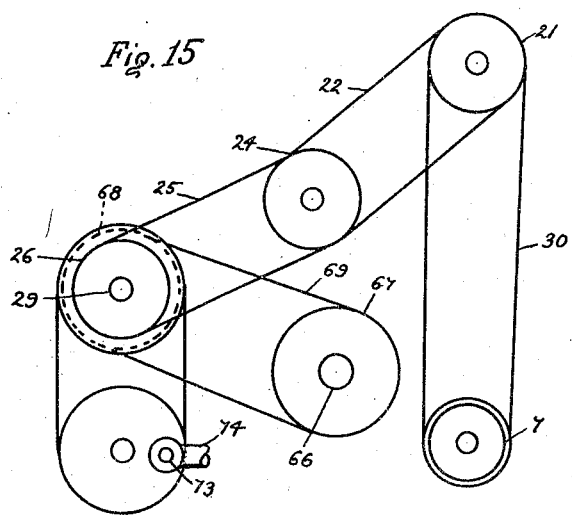
Figure 16:
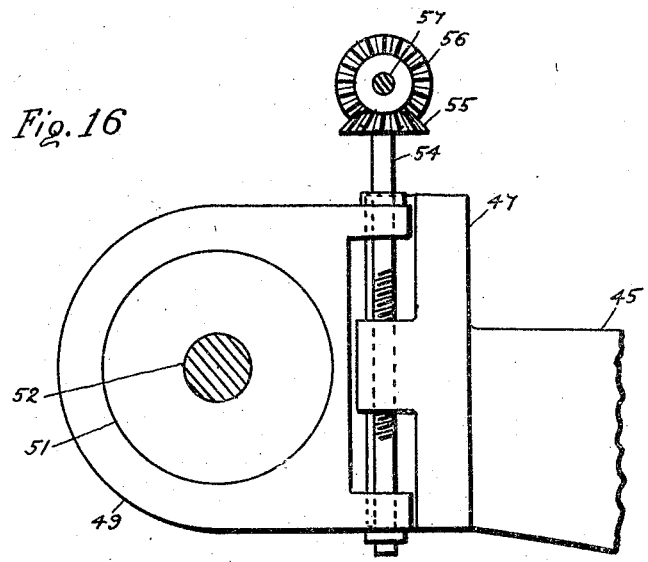

Fig. 1 is a plan view of my binder, Fig. 2 is a sectional view of brackets attaching the binder to the rear eaxle of the tractor, Fig. 3 is an elevation of same, Fig. 4 and Fig. 5 are detailed plan views of a hinged connection in the binder frame, Fig. 6 is a rear view of my binder, and Fig. 7 is an elevation of same. Fig. 8 is an enlarged partial view of the frame raising mechanism, Fig. 9 is a view of same in a raised position, Fig. 10 is a partial view of the gear arrangement for the beater, Fig. 11 is a top view of same, Fig. 12 is a view showing a device for adjusting the height of the beater, Fig. 13 is a detail view of the mechanism for adjusting the height of the side wheel on the frame, Fig. 14 is a plan view of the gears and chains for driving reaper, conveyor and other mechanisms, Fig. 15 is a front view of same, and Fig. 16 is a detail view of the frame raising mechanism.

My binder consists of a frame 1 with a wheel 2 rotatively mounted in sliding bearings which can be adjusted by means of a handle 3. An endless conveyor belt 4 is mounted on rollers 5 and 6 supported on the frame 1. A third roller 7 is rotatively mounted on a binding deck 8. The frame 1 is connected with the deck by means of hinges Figs. 4 and 5, the end members of the frame 1 and of the deck 8 being rotatively mounted on a shaft 9. Springs 10 tend to raise the frame 1 thereby facilitating its lifting by means of attachments hereinafter described. A modified arrangement may be used as shown in Fig. 9 with a retrieving spring 10′ shown with dotted lines.

The frame 1 is supported by means of levers 11 and 12 whch can be operated by a handle 13 within reach of the operator who occupies a seat 14.

The same handle 13 also operates vertical shafts 15 and 16. The shafts 15 and 16 are rotatively supported in a bracket 80 which can rotate on the shaft 59 and the shaft 15 has a bevel gear 17 in mesh with a gear 18. The gear 18 is mounted on the same shaft with a bevel gear 19 in mesh with a gear 20 mounted on the same shaft with a sprocket 21. A chain 22 drives this sprocket from a sprocket 23 conected with a sprocket 24 and by a chain 25 with a sprocket 26. The latter is connected by a chain 27 with a sprocket 28 on a shaft 29. A chain 30 operates a sprocket on the end of the roller 7 from the sprocket 21′. The roller 6 is connected with the roller 7 by means of a pair of sprockets 31 and 32 and a chain 33.

Beater bars 34 are supported by inclined radial bars 35 attached to hubs 36 and 37 mounted on a shaft 38. This shaft is supported in bearings 39 and 40. Bearing 39 is supported with a brace bar 41 attached to the upper end of a sliding sleeve 42 mounted on the shaft 16. A gear 43 is mounted on the end of the shaft 38 in mesh with a pinion 44 on the shaft 15. This pinion can slide up and down on the shaft 15 on a key so that it rotates with the shaft. The bearing 40 is threaded inside for the threads on the shaft 16 which can be rotated by the gear 81 on it in mesh with a sector 82 pivoted on shaft 15 and operated by a handle 13.

This arrangement permits vertical adjustment of the reel formed with bars 34 and 35. At the same time the axis of the reel under all conditions remains parallel to the frame 1.

The binding deck 8 is supported on brackets 45 and 46 attached to sliding blocks 47 and 48. These blocks can slide on yokes 49 and 50 rotatively mounted on special flanges 51 on a rear axle 52 of the tractor 53. The blocks 47 and 48 are threaded for vertical screws 54 provided with bevel gears 55 on top in mesh with gears 56 connected together with a shaft 57. This shaft may be turned by hand, or by means of worm gear 58 and shaft 59 with a clutch 60 driven from gears and sprockets 24 and 26. This arrangement allows to raise or to lower the brackets 45 and 46 according to the requirements of the work.

In addition to this adjustment the yokes 49 and 50 can rotate on the axle hubs within certain limits. For this purpose they are provided with elongated slots 61 for bolts 62. A bar 63 is attached to the axle flange 51 and is connected with a spring 64 attached to the yoke 49 or 50. The spring tends to relieve the weight of the binding deck and of the frame 1 in order to facilitate their passage over rough or inclined ground. A bar 65 attached to the yoke 49 provides a supporting point for the spring 64.

The above described gears and sprockets obtain their power from an extension 66 of the driving shaft of the tractor through sprockets 67 and 68 and chain 69. A shaft 29 transmits the power to the sprocket 28 and is provided with a clutch 71 which can be operated by a pedal or hand lever (not shown) of any suitable construction.

My binder is especially adapted to be used in connection with my binding or bundle tying mechanism which forms a subject of a separate patent application.

The operation of my binder is as follows.

The operator raises the frame and the reel in a position approaching vertical for transporting the machine to the field. When it is ready to be set in operation, he lowers again the frame and the reel, adjusting the height of the rear wheel 2 by the handle 3 and of the binding deck 8 by turning the screws 54. When the adjustments are completed he engages the clutch 71 on the shaft 29 thereby starting the rotation of the gears and sprockets described.

The gear 28 has an excentrically located pin 73 engaging a pitman 74 pivotally connected at the end with a cutter bar 75 of an ordinary construction. This cutter bar is supported by the frame 1 and moves with it up or down in accordance with the contour of the ground, also with the vertical adjustment of the rear wheel.

The height of the reel 34 is adjusted by moving the sleeve 42 on the shaft 16.

The stalks of grain, cut by the cutter bar and picked up by the reel, are carried by the belt conveyor 4 and moved to the binding deck 8 by the roller 7. On the binding deck they are bound and tied in bundles or dumped in bundles without tying. The mechanism for the tying and dumping is not shown, being a subject of a separate patent application.

Important advantages of my binder are that it employs a horizontal conveyor for stalks instead of an ordinary elevator, so that the power consumption for the movement of stalks is greatly reduced, the construction is simplified, as the conveyor does not require constant adjustments of the belt tension.

The hinged connections between the conveyor frame and the binder deck allows independent movements for the frame with cutter bar and conveyor, so that my binder can be used in a rough and hilly country, on the sides of slopes etc.

The reel strictly follows the frame, their parallel alignment being automatic. They both can be raised for transportation, and the raising into an inoperative position can be easily done by the operator by means of suitable levers, the weight of the frame being relieved to any desired degree by means of springs in hinged joints.

I claim as my invention:

1. In a binder, the combination with a frame, of a conveyor operatively mounted on said frame, a cutter bar on said frame, a binding deck, hinged connections between said frame and said binding deck, means to support said binding deck with said frame on a tractor, means to adjust the height of said binding deck, a roller adapted to transmit grain stalks from said conveyor to said binding deck, and means to operate said conveyor, said roller, and said cutter bar by said tractor.

2. In a binder, the combination with a frame, of a conveyor operatively mounted on said frame, a cutter bar on said frame, a binding deck, hinged connections between said frame and said binding deck, means to support said binding deck with said frame on the rear axle of a tractor, means to relieve the weight of said frame and said binding deck, a reel rotatively mounted on a shaft, supporting bushing for said shaft, a vertical shaft for said supporting bushing, means to adjust the height of said bushing on said shaft, and means to transmit rotation to said reel from said tractor.

3. In a binder, the combination with a frame, of a conveyor operatively mounted on said frame, a cutter bar on said frame, a binding deck, hinged connections between said binding deck and said frame, brackets adapted to support said binding deck with said frame, yokes rotatively mounted on the rear axle of a tractor, sliding connections between said yokes and said brackets, means to adjust the vertical position of said brackets on said yokes, and means to limit the rotative movement of said brackets on said rear axle.

4. In a binder, the combination with a frame, of a conveyor operatively connected with said frame, a cutter bar on said frame, a binding deck, hinged connections between said binding deck and said frame, means to support said binding deck and said frame on a tractor, a horizontal shaft, means to support said shaft on said frame, means to adjust the height of said shaft, a reel rotatively mounted on said shaft, operating connections between said reel and said tractor, means to raise said frame and said reel into inoperative position, and means to adjust the height of said frame and said binding deck.

5. In a binder, the combination with a frame, of a conveyor operatively mounted on said frame, a cutter bar on said frame, means to support said frame on said tractor, a reel rotatively supported on said frame in a cooperative relation with said cutter bar, means to adjust the height of said frame, said frame with said reel being adapted to be raised into inoperative position, and means to operate said conveyor, said cutter and said reel from the driving shaft of said tractor independently of said vertical adjustments of said frame.

Signed at Berlin, in the county of Brandenburg and State of Prussia, this 15th day of June, A. D. 1928.

PAWEL Y. BORODIN.